United States Patent
Narasimha et al.

(10) Patent No.: US 8,942,166 B2
(45) Date of Patent: Jan. 27, 2015

(54) METHOD FOR PROVIDING A CONTENTION BASED UPLINK CHANNEL

(75) Inventors: Murali Narasimha, Lake Zurich, IL (US); Gerrit Hiddink, Utrecht (NL); Ravi Kuchibhotla, Gurnee, IL (US); Robert Love, Barrington, IL (US); Ajit Nimbalker, Arlington Heights, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 792 days.

(21) Appl. No.: 12/705,126

(22) Filed: Feb. 12, 2010

(65) Prior Publication Data

US 2011/0199961 A1 Aug. 18, 2011

(51) Int. Cl.
*H04W 4/00* (2009.01)
*H04W 74/00* (2009.01)
*H04W 74/08* (2009.01)

(52) U.S. Cl.
CPC ............ *H04W 74/006* (2013.01); *H04W 74/08* (2013.01); *H04W 74/0833* (2013.01)
USPC ............ 370/328; 370/329; 370/338; 370/341

(58) Field of Classification Search
USPC .................................. 370/328, 329, 338, 341
See application file for complete search history.

(56) References Cited

U.S. PATENT DOCUMENTS

| | | | |
|---|---|---|---|
| 7,203,164 B2 | 4/2007 | Gummalla et al. | |
| 7,355,964 B2 | 4/2008 | Geile et al. | |
| 2007/0025300 A1* | 2/2007 | Terry et al. | 370/335 |
| 2007/0178932 A1* | 8/2007 | Miklos et al. | 455/525 |
| 2008/0159334 A1 | 7/2008 | Venkatachalam et al. | |
| 2008/0232284 A1* | 9/2008 | Dalsgaard et al. | 370/310 |
| 2009/0092086 A1 | 4/2009 | Lee et al. | |
| 2009/0109907 A1 | 4/2009 | Tsai et al. | |
| 2009/0238366 A1* | 9/2009 | Park et al. | 380/270 |
| 2009/0310553 A1* | 12/2009 | Kim et al. | 370/329 |
| 2011/0039568 A1* | 2/2011 | Zhang et al. | 455/452.1 |
| 2011/0223924 A1* | 9/2011 | Lohr et al. | 455/450 |
| 2011/0292895 A1* | 12/2011 | Wager et al. | 370/329 |
| 2012/0014269 A1* | 1/2012 | Ray et al. | 370/252 |
| 2012/0044878 A1 | 2/2012 | Ratasuk et al. | |
| 2012/0163322 A1* | 6/2012 | Larmo et al. | 370/329 |

FOREIGN PATENT DOCUMENTS

| | | |
|---|---|---|
| EP | 2101539 A2 | 7/2009 |
| EP | 2166805 B1 | 10/2011 |

OTHER PUBLICATIONS

NTT DoCoMo; Random Access Channel Structure for E-UTRA Uplink; 3GPP TSG-RAN WG1 Meeting #44bis R1-060786 Athens, Greece, Mar. 27-31, 2006.

(Continued)

*Primary Examiner* — Noel Beharry
*Assistant Examiner* — Kodzovi Acolatse
(74) *Attorney, Agent, or Firm* — Lerner, David, Littenberg, Krumholz & Mentlik, LLP

(57) ABSTRACT

A method, a mobile system, and a user communication device are disclosed. A receiving unit 408 may receive a downlink packet 620 from a base station 108. A configuration data storage 412 may store contention based grant data upon receiving the downlink packet 620 and prior to an uplink packet 810 becoming available. A transmitting unit may send an uplink packet 810 based on the contention based grant data.

21 Claims, 15 Drawing Sheets

(56) References Cited

OTHER PUBLICATIONS

Ericsson; LTE Advanced Latency Performance; 3GPP TSG-RAN WG2 #65bis R2-092080 Seoul, Korea, Mar. 23-27, 2009.

Ericsson, St-Ericsson; Contention Based Uplink Transmissions; 3GPP TSG-RAN WG2 #66bis R2-093812 Los Angeles, USA, Jun. 29, 2009-Jul. 3, 2009.

Sunna, Lilan: "Contention-based uplink transmission in unscheduled access", Master's Thesis, LTU, Dept. of Computer Science and Electrical Engineering, Ericsson AB Dept. of Wireless Access Networks, Div. of Wireless IP Optimizations, , Jan. 15, 2010, 2010:009 CIV—ISSN: 1402-1617—ISRN: LTU-EX—10/009—SE, all pages.

"LTE; Feasibility study for Further Advancements for E-UTRA (LTE-Advanced) (3GPP TR 36.912 version 9.1.0 Release 9)", Technical Report, European Telecommunications Standards Institute (ETSI), 650, Route Des Lucioles ; F-06921 Sophia-Antipolis; France, No. V9.1.0, Jan. 1, 2010, XP014045013, all pages.

Ericsson et al: "Contention based uplink transmissions", 3GPP Draft R2-093812_Contention_Based_Uplink, 3rd Generation Partnership Project (3GPP), Mobile Competence Centre ; 650, Route Des Lucioles ; F-06921 Sophia-Antipolis Cedex; France, no. Los Angeles, USA; Jun. 23, 2009, XP050352029, [retrieved on Jun. 23, 2009], all pages.

Patent Cooperation Treaty, International Search Report and Written Opinion of the International Searching Authority for International Application No. PCT/US2011/024744, May 19, 2011, 13 pages.

\* cited by examiner

300

302

| RNTI 510 | PDCCH Body 520 | CBG 530 |

500
Figure 5

| L1/L2/L3 Body 1010 | CBG 1020 | Frames 1030 | Change Flag 1040 |

1000
Figure 10

| L1/L2/L3 Body 1110 | CBG 1 1120 | Frame 1 1130 | ••• | CBG N 1120 | Frame N 1130 |

METHOD FOR PROVIDING A CONTENTION BASED UPLINK CHANNEL

FIELD OF THE INVENTION

The present invention relates to a method and system for performing an uplink transmission with a base station. The present invention further relates to using a contention based grant allocation to perform the uplink transmission.

INTRODUCTION

The Third Generation Partnership Project (3GPP) is developing a Long Term Evolution (LTE) standard using a physical layer based on globally applicable evolved universal terrestrial radio access (E-UTRA). In release-8 specification of LTE, a wireless terminal device, often referred to as a piece of user equipment (UE), may connect with an LTE base station, referred to as an enhanced Node-B (eNB), using a dedicated uplink resource.

When the UE does not have dedicated uplink resources, the UE may transmit a scheduling request (SR) to the eNB. The UE may receive an uplink resource grant from the eNB. The UE may then transmit packets on the granted resources.

The transmission delay may be reduced by using a contention based uplink channel. In a contention based uplink channel, rather than having a resource of the eNB dedicated to a single UE, multiple UEs may vie for the use of a resource at the eNB. The contention based uplink channel may reduce the delay by eliminating the wait time caused by the SR or resource grant exchange.

SUMMARY OF THE INVENTION

A method, a mobile system, and a user communication device are disclosed. A receiving unit may receive a downlink packet from a base station. A configuration data storage may store contention based grant data upon receiving the downlink packet and prior to an uplink packet becoming available. A transmitting unit may send an uplink packet based on the contention based grant data.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which:

FIG. 5 illustrates, in a block diagram, one embodiment of a contention based grant allocation message.

FIG. 10 illustrates, in a block diagram, one embodiment of a persistent contention based grant allocation message.

FIG. 11 illustrates, in a block diagram, an alternate embodiment of a persistent contention based grant allocation message.

DETAILED DESCRIPTION OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, a user communication device, and a mobile system, and other embodiments that relate to the basic concepts of the invention. The mobile system or user communication device may be any manner of computer, mobile device, or wireless communication device.

A method, a mobile system, and a user communication device are disclosed. A receiving unit may receive a downlink packet from a base station. A configuration data storage may store contention based grant data upon receiving the downlink packet and prior to an uplink packet becoming available. A transmitting unit may send an uplink packet based on the contention based grant data. Alternately, a configuration data storage may store at least one of a long term contention based grant data set received from a long term persistent contention based grant allocation message and a short term contention based grant data set received from a short term persistent contention based grant allocation message. In another embodiment, a configuration data storage may store a persistent contention based grant data set received in a persistent contention based grant allocation message and activated by an activation signal.

Figure 1:
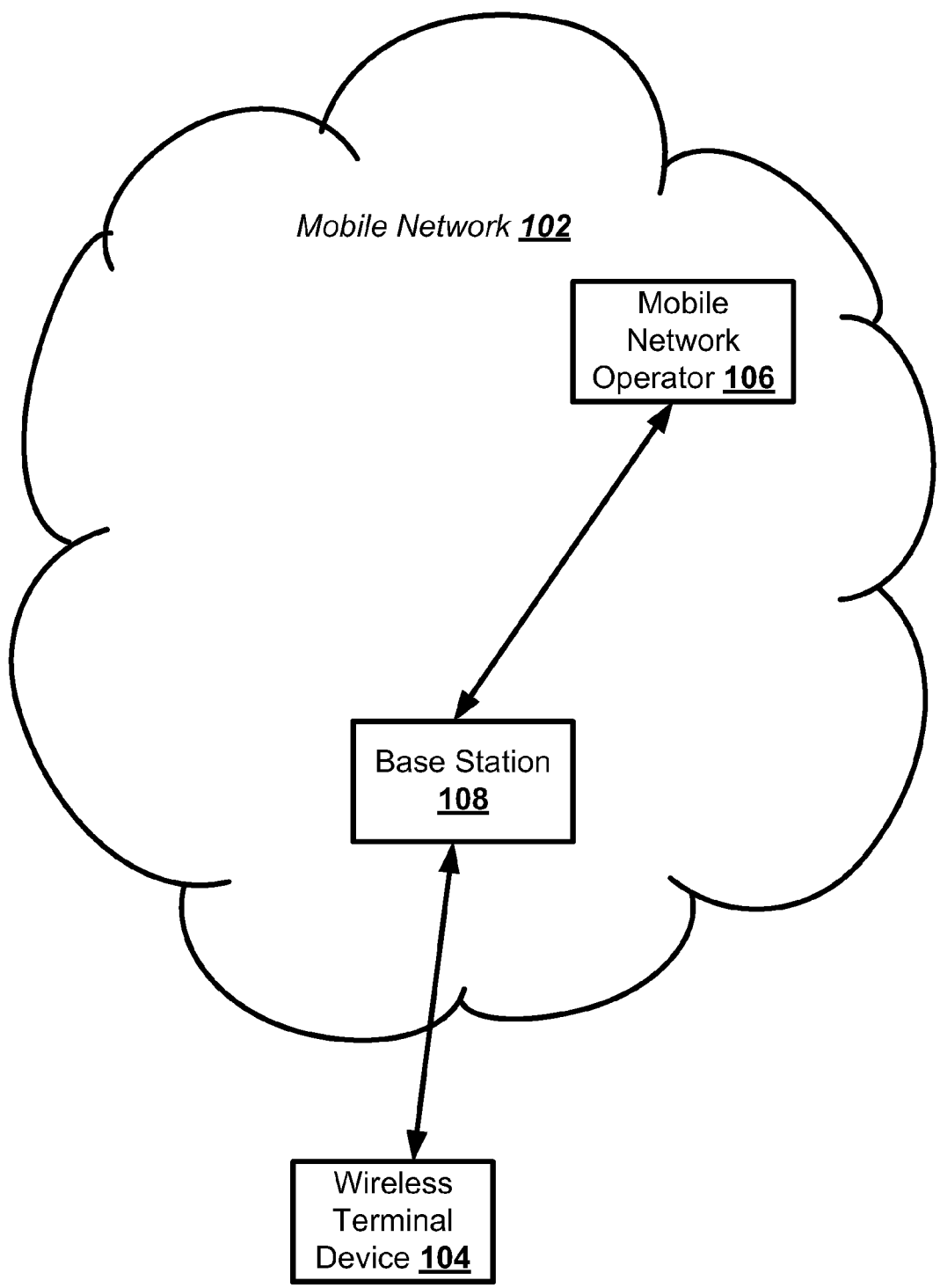
FIG. 1 illustrates in a block diagram one embodiment of a communication system.

FIG. 1 illustrates one embodiment of a communication system 100. The communication system 100 may include a core mobile network 102 that may be accessed by at least one mobile device 104, such as a wireless terminal device, or user equipment (UE). The wireless terminals 104 may be fixed or mobile. The wireless terminals 104 may also be referred to as subscriber units, mobiles, mobile stations, user, terminals, subscriber stations, user terminals, wireless communication devices, user devices, or by other terminology used in the art. Various communication devices may exchange data or information through the core mobile network 102. The core mobile network 102 may be a WiMAX network, a universal terrestrial radio access network (UTRAN) cellular network, an evolved UTRAN (E-UTRAN) cellular network, or other type of telecommunication network. A server or a series of servers controlled by a network operator, referred to herein as a network operator server 106, or a mobile network operator 106, may administer the network. The network operator server 106 may maintain a set of data to facilitate access of the core mobile network 102 by the wireless terminal device 104. The mobile system 104 may access the network via a network base station 108. A base unit 108 may also be referred to as an access point, access terminal, base, base station, Node-B, eNode-B, Home Node-B, Home eNode-B, relay node, or by other terminology used in the art.

Figure 2:
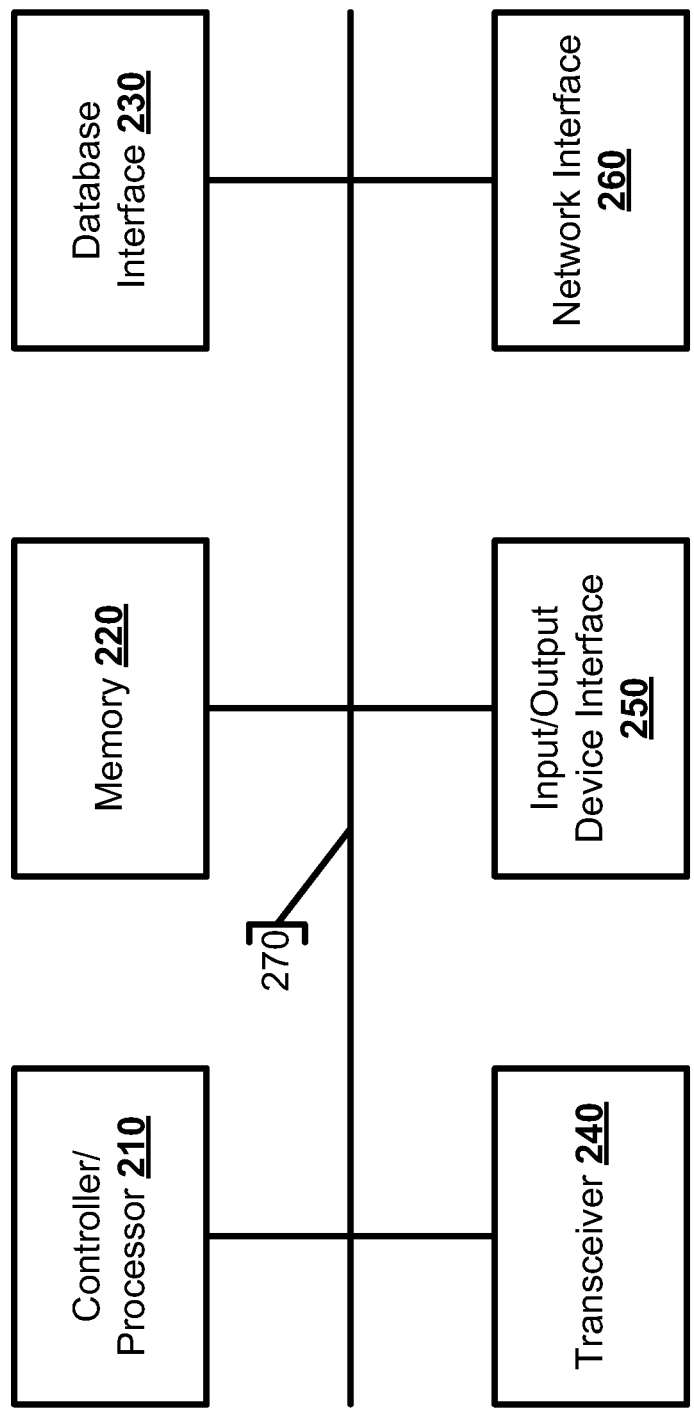
FIG. 2 illustrates a possible configuration of a computing system to act as a base transceiver station.

FIG. 2 illustrates a possible configuration of a computing system 200 to act as a network operator server 106 or a network base station 108. The computing system 200 may include a controller/processor 210, a memory 220, a database interface 230, a transceiver 240, input/output (I/O) device interface 250, and a network interface 260, connected through bus 270. The network server 200 may implement any operating system. Client and server software may be written in any programming language, such as C, C++, Java or Visual Basic, for example. The server software may run on an application framework, such as, for example, a Java® server or .NET® framework The controller/processor 210 may be any programmed processor known to one of skill in the art. However, the disclosed method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the disclosed method as described herein may be used to implement the disclosed system functions of this invention.

The memory 220 may include volatile and nonvolatile data storage, including one or more electrical, magnetic or optical memories such as a random access memory (RAM), cache, hard drive, or other memory device. The memory may have a cache to speed access to specific data. The memory 220 may also be connected to a compact disc-read only memory (CD-ROM), digital video disc-read only memory (DVD-ROM), DVD read write input, tape drive, or other removable memory device that allows media content to be directly uploaded into the system.

Data may be stored in the memory or in a separate database. The database interface 230 may be used by the controller/processor 210 to access the database. The database may contain subscriber information for each mobile system 104 that may access the mobile network 102. Further, the database may maintain network performance data, such as network topology, network geographic location and peer proximity, network load distribution, and other network data.

The transceiver 240 may create a connection with the mobile device 104. The transceiver 240 may be incorporated into a base station 200 or may be a separate device.

The I/O device interface 250 may be connected to one or more input devices that may include a keyboard, mouse, pen-operated touch screen or monitor, voice-recognition device, or any other device that accepts input. The I/O device interface 250 may also be connected to one or more output devices, such as a monitor, printer, disk drive, speakers, or any other device provided to output data. The I/O device interface 250 may receive a data task or connection criteria from a network administrator.

The network connection interface 260 may be connected to a communication device, modem, network interface card, a transceiver, or any other device capable of transmitting and receiving signals from the network. The network connection interface 260 may be used to connect a client device to a network. The components of the network server 200 may be connected via an electrical bus 270, for example, or linked wirelessly.

Client software and databases may be accessed by the controller/processor 210 from memory 220, and may include, for example, database applications, word processing applications, as well as components that embody the disclosed functionality of the present invention. The network server 200 may implement any operating system. Client and server software may be written in any programming language. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
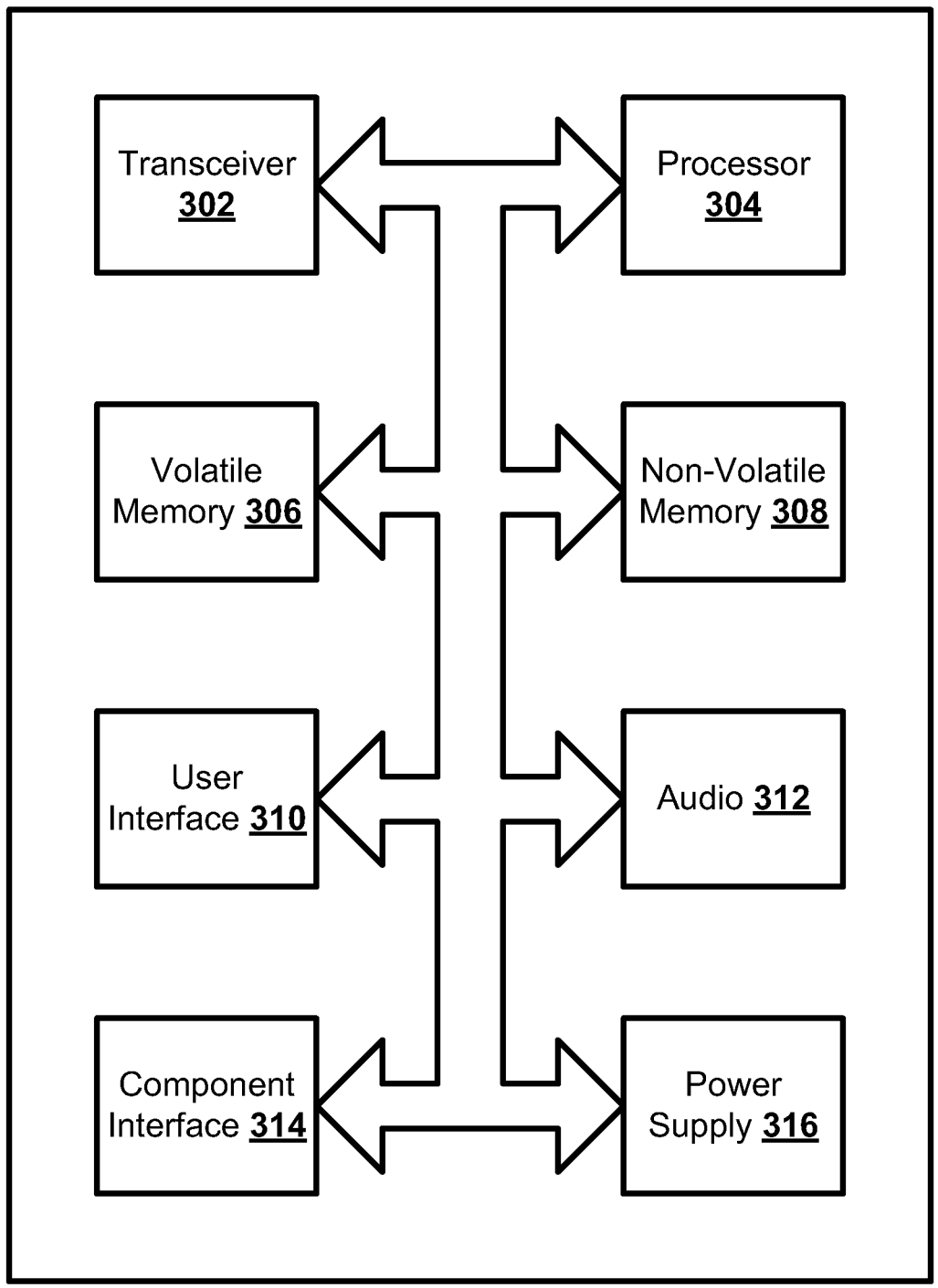
FIG. 3 illustrates, in a block diagram, one embodiment of a mobile system or electronic device to create a radio connection.

FIG. 3 illustrates one embodiment of a wireless terminal device 300, capable of acting as a mobile system, electronic device, or user communication device. For some embodiments of the present invention, the mobile device 300 may also support one or more applications for performing various communications with a network. The mobile device 300 may be a handheld device, such as, a mobile phone, a laptop, or a personal digital assistant (PDA). For some embodiments of the present invention, the user device 300 may be WiFi® capable device, which may be used to access the network mobile for data or by voice using VOIP.

The mobile device 300 may include a transceiver 302, which is capable of sending and receiving data over the mobile network 102. The mobile device 300 may include a processor 304 that executes stored programs. The mobile device 300 may also include a volatile memory 306 and a non-volatile memory 308 to act as data storage for the processor 304. The mobile device 300 may include a user input interface 310 that may comprise elements such as a keypad, display, touch screen, and the like. The mobile device 300 may also include a user output device that may comprise a display screen and an audio interface 312 that may comprise elements such as a microphone, earphone, and speaker. The mobile device 300 also may include a component interface 314 to which additional elements may be attached, for example, a universal serial bus (USB) interface or a geographical positioning system (GPS). Finally, the mobile device 300 may include a power supply 316.

Figure 4:
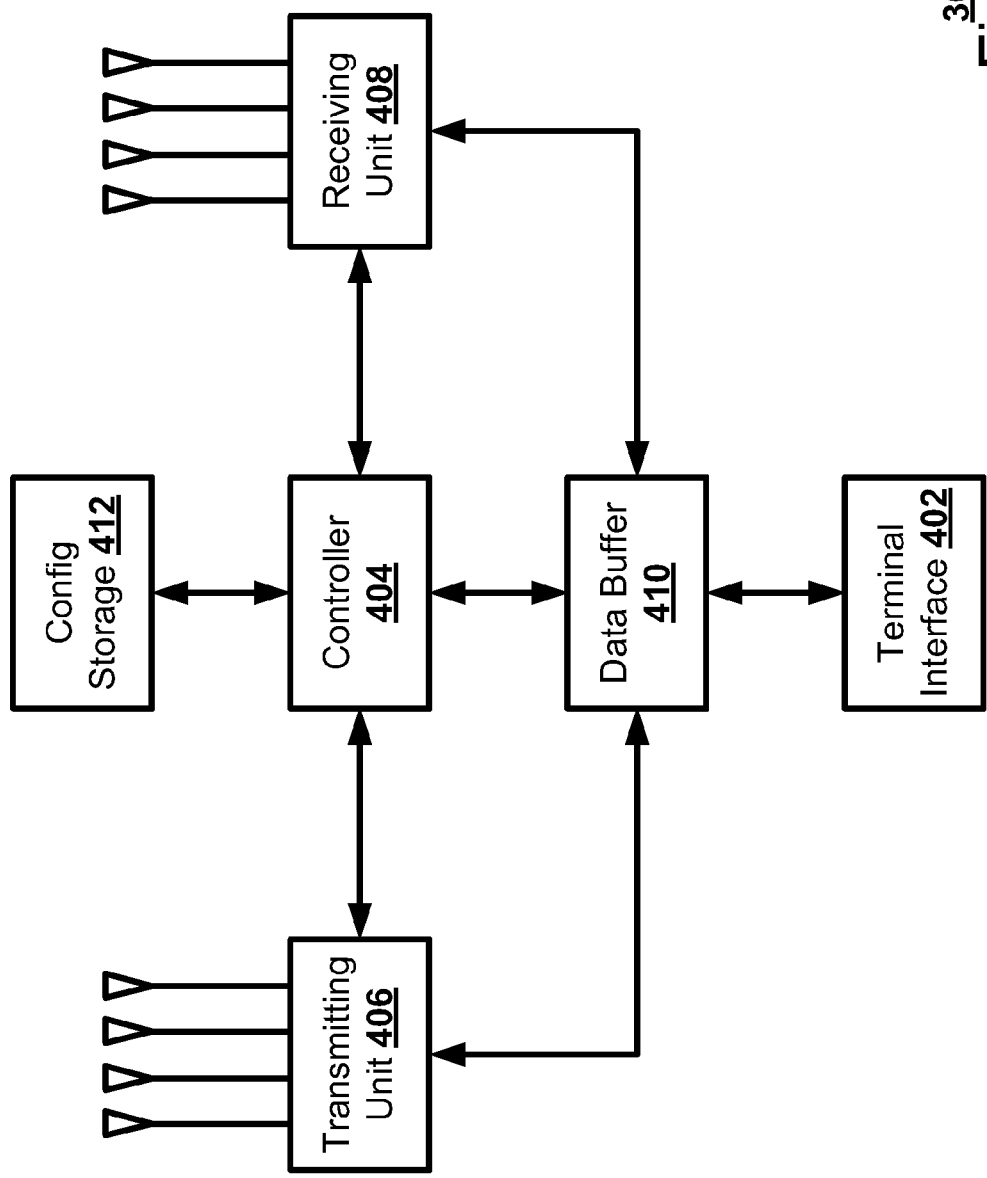
FIG. 4 illustrates, in a block diagram, one embodiment of a transceiver.

FIG. 4 illustrates one embodiment of a transceiver 302. A terminal interface 402 may send received signals to the UE device 104 and receive transmissions from the UE device 104. A controller 404 may encode data into an uplink packet to be sent by a transmitting unit 406 to the base station 108 and decode a downlink packet received from the base station 108 by a receiving unit 408. A data buffer 410 may store data provided by the UE device 104 for transmission prior to encoding into uplink packets, as well as store downlink packets prior to decoding. The transceiver 302 may have a configuration data storage 412 to store configuration data for transmitting and receiving data. The volatile memory 306 or the non-volatile memory 308 may act as the configuration data storage 412.

The UE device 104 may use a contention based uplink to speed up communications with a base station 108. The base station 108 may notify the UE device 104 of a set of contention based radio network temporary identifiers (RNTIs). The UE device 104 may monitor the physical data control channel (PDDCH) in each subframe for contention based RNTIs and associated uplink contention based grants. Alternatively, the base station 108 may signal the uplink contention based grants using a PDCCH addressed to a system information RNTI. The UE device 104 may monitor the PDCCH for the system information RNTI and associated uplink grants.

After receiving a contention based grant (CBG), the UE device 104 may perform all processing of an uplink packet to be sent, such as physical layer or upper layer processing. For example, the UE device 104 may transmit an uplink packet, or a transport block, using turbo code as an encoder and using a redundancy version (RV), such as 0, for generating the coded bits that are mapped to a quadratic amplitude modulation (QAM) scheme, such as quadratic phase shift keying (QPSK), 16QAM, or 64QAM. The number of coded bits, RV, and modulation and coding scheme (MCS) may be signaled or derived from the CBG information. The UE device 104 may perform the uplink transmission via a single antenna transmission or using multiple antennas.

The uplink transmission resources, such as the time frequency resources, may be contiguous or non-contiguous in frequency, using the discrete Fourier transform (DFT) spread orthogonal frequency division multiplexing (OFDM). The CBG may further include physical layer information, such as the cyclic shift value for the uplink reference signals, or pilots, or a delay parameter. The delay parameter may be used to minimize the likelihood of more than one UE device 104 attempting to use the same CBG. For example, the UE device 104 may generate a random number between 0 and 1 to compare with the delay parameter. Based on the result, the UE device 104 may determine whether to transmit on the contention based uplink.

The UE device 104 may transmit the uplink packet on a physical uplink shared channel (PUSCH) using the resources granted in the CBG, reducing a delay in transmitting the uplink packet from 11.5 ms to 5.5 ms. After receiving and successfully decoding an uplink transmission, the base station 108 may additionally inform the UE device 104 of the successful or unsuccessful uplink packet reception via an acknowledgement channel, using an ACK or a negative ACK (NACK). In case a UE device 104 does not receive an ACK, the UE device 104 may attempt to retransmit the uplink packet again using a CBG. Alternatively, the UE device 104 may attempt to retransmit the uplink packet using a non-contention based UE specific uplink grant.

FIG. 5 illustrates, in a block diagram, one embodiment of a CBG allocation message 500. The CBG allocation message 500 may be sent as a PDCCH transmission. The CBG allocation message 500 may be addressed with a RNTI 510. The RNTI may be a contention based RNTI or a system information RNTI. The set of contention based RNTIs 510 may be independently signaled to UE devices. A UE device 104 may know the system information RNTI beforehand. The CBG allocation message 500 may have a PDCCH body 520 containing the PDCCH data. The CBG allocation message 500 may have a CBG allocation 530, alerting the UE device 104 as to which communication resource on the base station 108 may be addressed by a contention based uplink packet. The CBG allocation 530 may provide a time-frequency resource.

Figure 6:
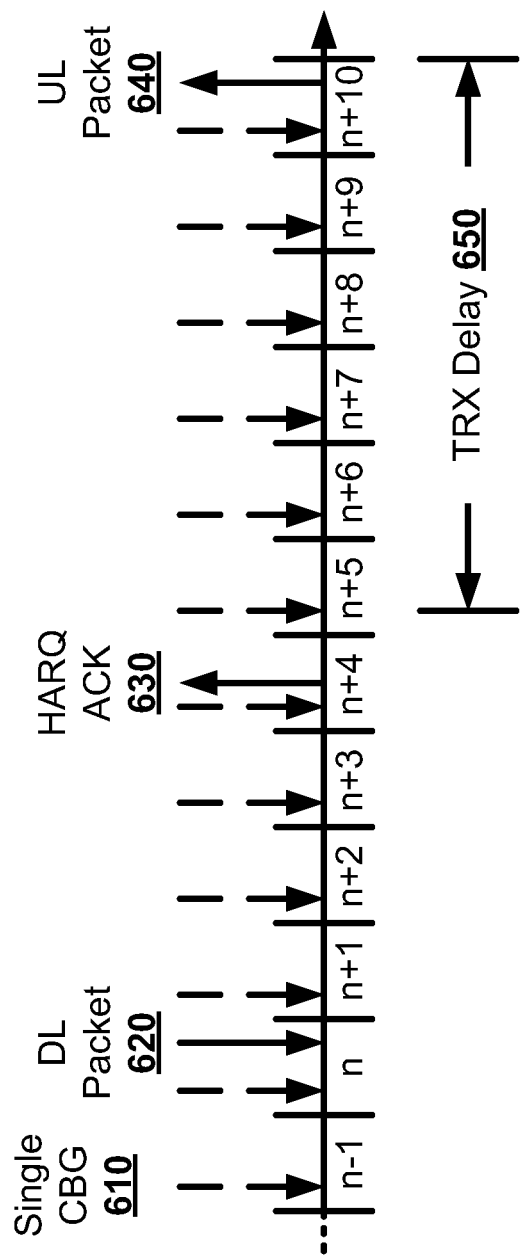
FIG. 6 illustrates, in a timing diagram, one embodiment of a sequence for sending a transmission on a contention based uplink channel.

FIG. 6 illustrates, in a timing diagram, one embodiment of a sequence 600 for sending a transmission on a contention based uplink channel. The base station 108 may send a single instance CBG allocation message 610 once per subframe. The UE device 104 may receive a downlink (DL) packet 620, such as a transmission control protocol (TCP) packet, in subframe n. The UE device 104 may respond by sending a hybrid automatic repeat request (HARQ) ACK 630 to provide error checking for the channel. When an uplink packet becomes available to the physical layer, for example in subframe n+5, the UE device 104 may begin storing the CBG data 530 received in the series of single instance CBG allocation messages 610. After the CBG data 530 has been stored, the UE device 104 may configure the uplink (UL) packet 640 for transmission according to the CBG resources in the message received in subframe n+6. After the UE device 104 has configured the UL packet 640, the UE device 104 may transmit the UL packet 640 to the base station on the contention based uplink channel. As the UE device 104 does not start storing the CBG data 530 until the UL packet 640 is available from the physical layer, the UE device 104 may have a transmission (TRX) delay 650 before transmitting the UL packet 640.

Figure 7:
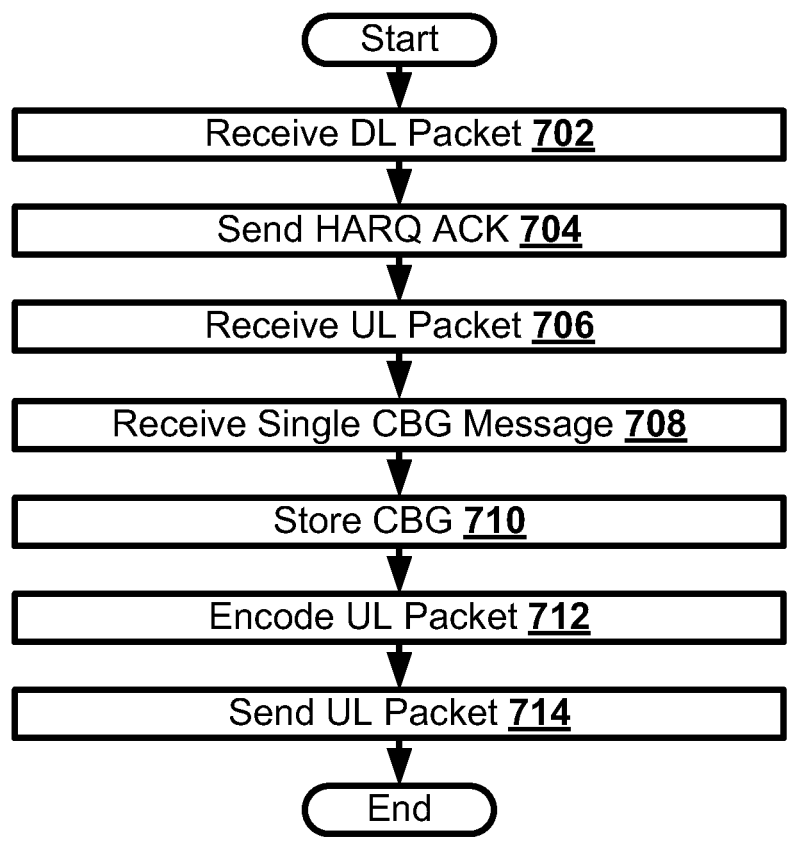
FIG. 7 illustrates, in a flowchart, one embodiment of a method for sending a transmission on a contention based uplink channel.

FIG. 7 illustrates, in a flowchart, one embodiment of a method 700 for transmitting on a contention based uplink channel. The transceiver 302 of the UE device 104 may receive a DL packet 620 from a base station 108 (Block 702). The transceiver 302 may respond by sending a HARQ ACK 630 to the base station 108 (Block 704). The transceiver 302 may receive a UL packet for transmission from the UE device 104 (Block 706). The transceiver 302 may receive a single instance CBG allocation message 610 from the base station 108 as a PDCCH transmission addressed to the contention based RNTI 510 (Block 708). The transceiver 302 may store the CBG data 530 in the configuration data storage 412 (Block 710). The controller 404 of the transceiver 302 may encode the UL packet 640 for transmission based on the CBG data 530 (Block 712). The transmitting unit 406 of the transceiver 302 may send the UL packet 640 to the base station 108 on the contention based uplink channel (Block 714).

Figure 8:
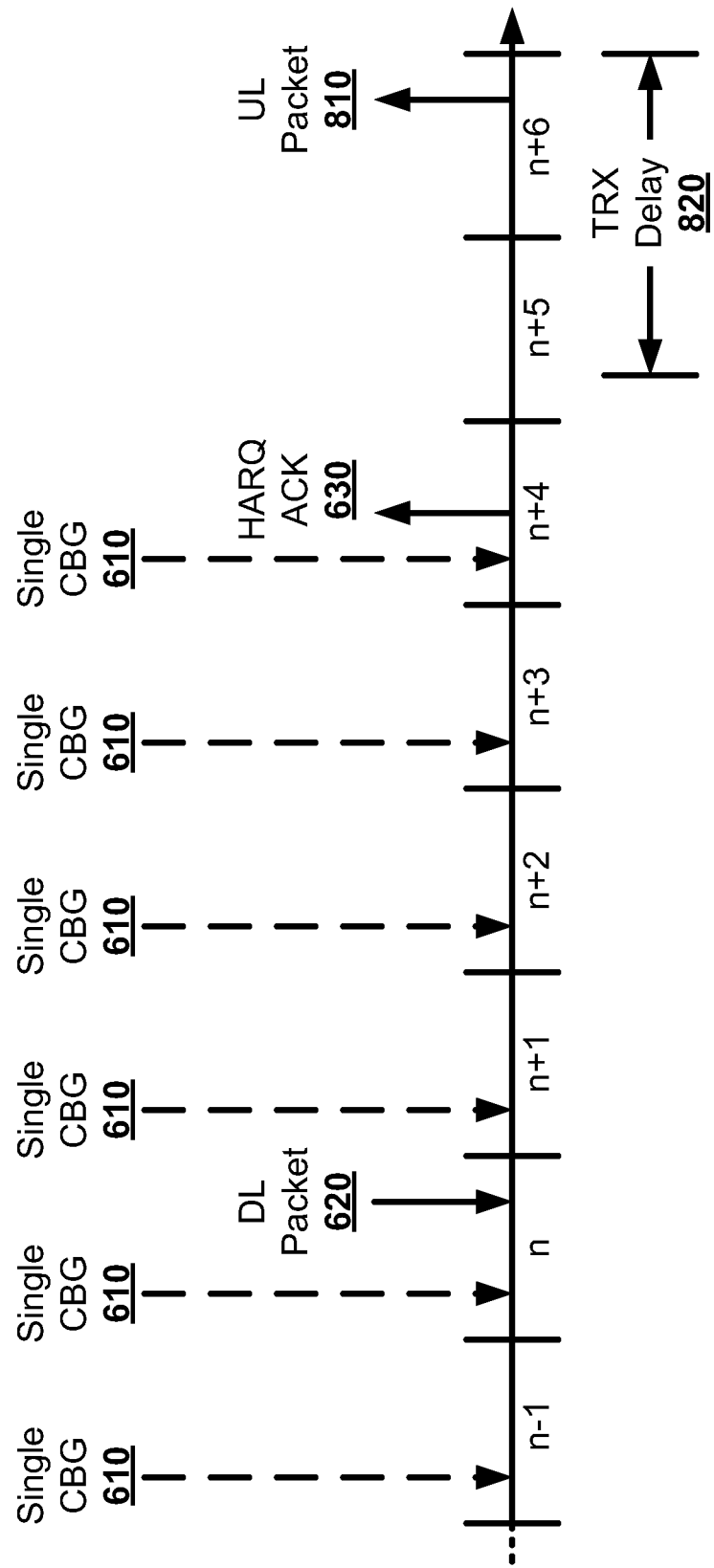
FIG. 8 illustrates, in a timing diagram, one embodiment of a sequence for sending a transmission on a contention based uplink channel using stored grant data.

FIG. 8 illustrates, in a timing diagram, one embodiment of a sequence 800 for sending a transmission on a contention based uplink channel using stored grant data. The base station 108 may send a single instance CBG allocation message 610 once per subframe. The UE device 104 may receive a DL packet 620 in subframe n. The UE device 104 may respond by sending a HARQ ACK 630 to provide error checking for the channel.

The UE device 104 may start storing the CBG data 530 upon receipt of the DL packet 620. The DL packet 620 may trigger storage of the CBG data 530 by the UE device 104. After the CBG data 530 has been stored and a UL packet becomes available from the first layer, the UE device 104 may configure the UL packet 810 for transmission according to the CBG resources in the message received in subframe n+2. As the transceiver has an earlier start on storing the CBG data 530, the TRX delay 820 for the pre-stored CBG data 530 may be substantially less than the standard TRX delay 650.

Figure 9:
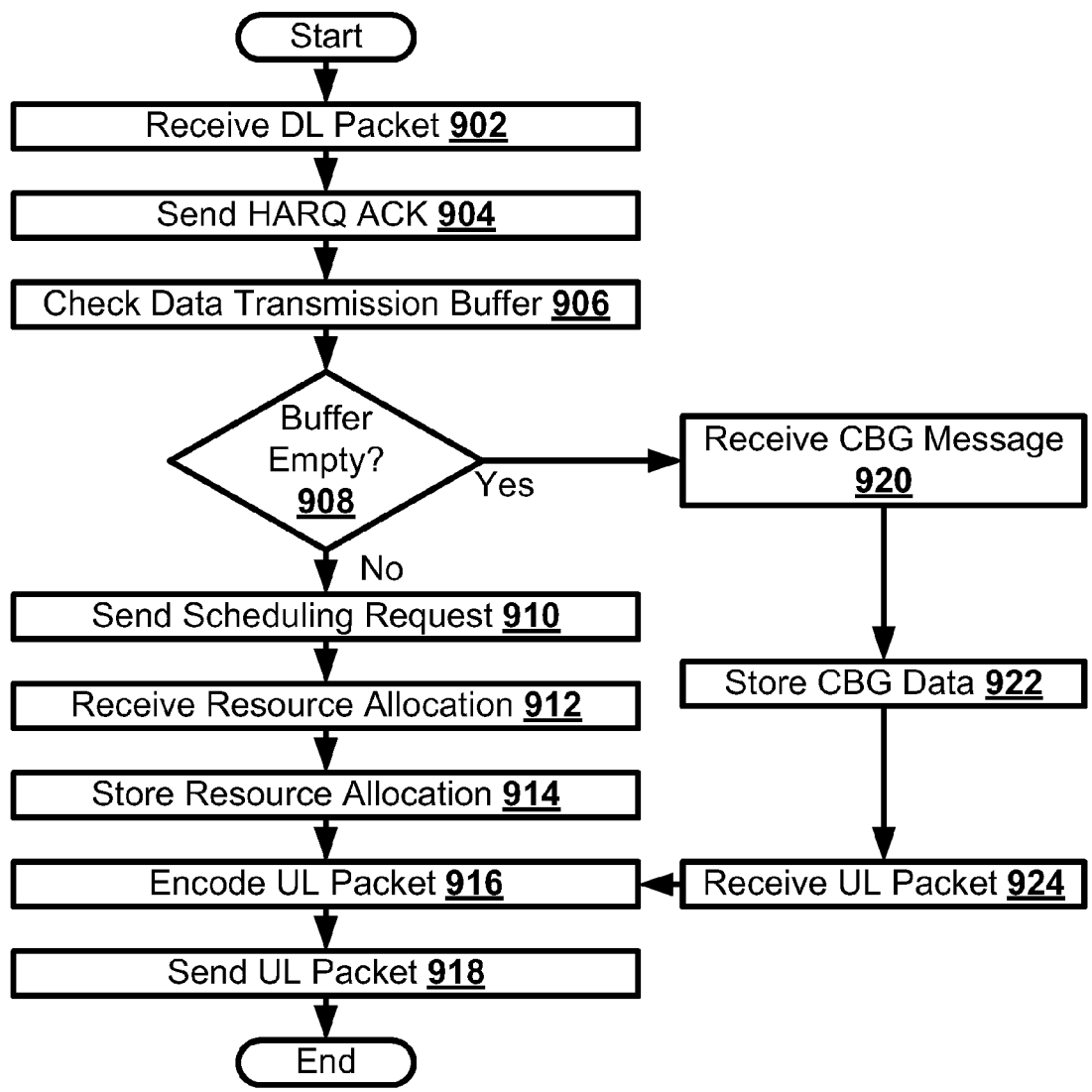
FIG. 9 illustrates, in a flowchart, one embodiment of a method for sending a transmission on a contention based uplink channel using stored grant data.

FIG. 9 illustrates, in a flowchart, one embodiment of a method 900 for sending a transmission on a contention based uplink channel using stored grant data. The transceiver 302 of the UE device 104 may receive a DL packet 620 from a base station 108 (Block 902). The transceiver 302 may respond by sending a HARQ ACK 630 to the base station 108 (Block 904). The controller 404 of the transceiver 302 may check the data transmission buffer 410 to determine whether the data transmission buffer is empty upon receiving the DL packet 620 (Block 906). If the data transmission buffer 410 is not empty (Block 908), the transceiver 302 may send a scheduling request (Block 910). The transceiver 302 of the UE device 104 may receive a resource allocation (Block 912). The transceiver 302 may store that resource allocation in the configuration data storage 412 (Block 914). The controller 404 of the transceiver 302 may encode the UL packet 810 for transmission based on the stored configuration data (Block 916). The transmitting unit 406 of the transceiver 302 may send the UL packet 810 to the base station 108 on the uplink channel determined by the stored configuration data (Block 918).

If the data transmission buffer 410 is empty (Block 908), the transceiver 302 may receive a single instance CBG allocation message 610 from the base station 108 as a PDCCH transmission addressed to a contention based RNTI or a system information RNTI (Block 920). The transceiver 302 may store the CBG data 530 in the configuration data storage 412 (Block 922). The transceiver 302 may receive a UL packet for transmission from the UE device 104 (Block 924). The UE device 104 may then encode the UL packet 810 based on the stored configuration data (Block 916).

A CBG allocation message may advertise a contention based resource for multiple subframes. In a cell with light uplink loading conditions, unused uplink resources may be available in every subframe. However, the downlink channel may be more heavily loaded, with some applications having more downlink data transfer than uplink data transfer. Thus the PDCCH capacity in each subframe may not be adequate to indicate CBG allocations. Similarly, gaming applications may be usable even when the loading conditions are not light, and using PDCCH transmission to indicate CBG may limit the utility of the contention based uplink feature.

Persistent resources may be reserved for contention based uplink transmissions for a specific duration, such as availability on the same time frequency resources in all subframes, even subframes, or odd subframes. A CBG allocation corresponding to the persistent resources may be advertised in broadcast messages. In light load conditions the persistence duration of the resources may be quite long, alleviating the PDCCH load problem while still making quick transmission of uplink packets possible.

The base station 108 may advertise a persistent CBG allocation in a persistent CBG allocation message 1000. The persistent CBG allocation message 1000 may be a broadcast message transmitted at predetermined times. The first subframe for which the persistent CBG allocation is valid may be a set number of subframes after the persistent CBG allocation message 1000 is sent, referred to herein as an allocation lag. The allocation lag may be a single subframe if the grants change frequently. Under current MAC release 8 standards, the allocation lag may be four subframes after the persistent CBG allocation message 1000. For a layer 3 (L3) message, the allocation lag may be five or ten subframes after the persistent CBG allocation message 1000 to allow for L3 parsing of message.

FIG. 10 illustrates, in a block diagram, one embodiment of a persistent CBG allocation message 1000. A persistent contention based grant allocation message 1000 may be at least one of a L3 message, such as a system information message; a layer 2 (L2) message, such as a medium access control (MAC) element; or a layer 1 (L1) message, such as a grant allocation message. The persistent CBG allocation message 1000 may include a message body 1010. The persistent CBG allocation message 1000 may have a CBG allocation 1020, including a radio resource and an access frequency. The persistent CBG allocation message 1000 may list a frame set 1030 for which the CBG allocation 1020 is available. The frame set 1030 may list availability for a set number of frames or list specific individual frames. The frame set 1030 may be continuous or discrete.

The persistent CBG allocation message 1000 may have a change flag 1040 to signal whether the persistent CBG allocation message has changed since the previous transmission. If the allocation lag is relatively large, the UE device 104 may reduce the TRX delay by immediately using the CBG allocations without waiting for the allocation lag.

Alternately, a persistent CBG allocation message may list multiple CBG allocations, each with a different frame set. FIG. 11 illustrates, in a block diagram, an alternate embodiment of a persistent CBG allocation message 1100. The alternate persistent CBG allocation message 1100 may include a message body 1110. The alternate persistent CBG allocation message 1100 may have multiple CBG allocations 1120, each including a time-frequency resource or resources. The persistent CBG allocation message 1100 may list a frame set 1130 for each CBG allocation 1120. The frame set 1130 may list availability for a set number of frames or list specific individual frames. The frame set 1130 may be continuous or discrete. The frame set 1130 may list a single frame.

Figure 12:
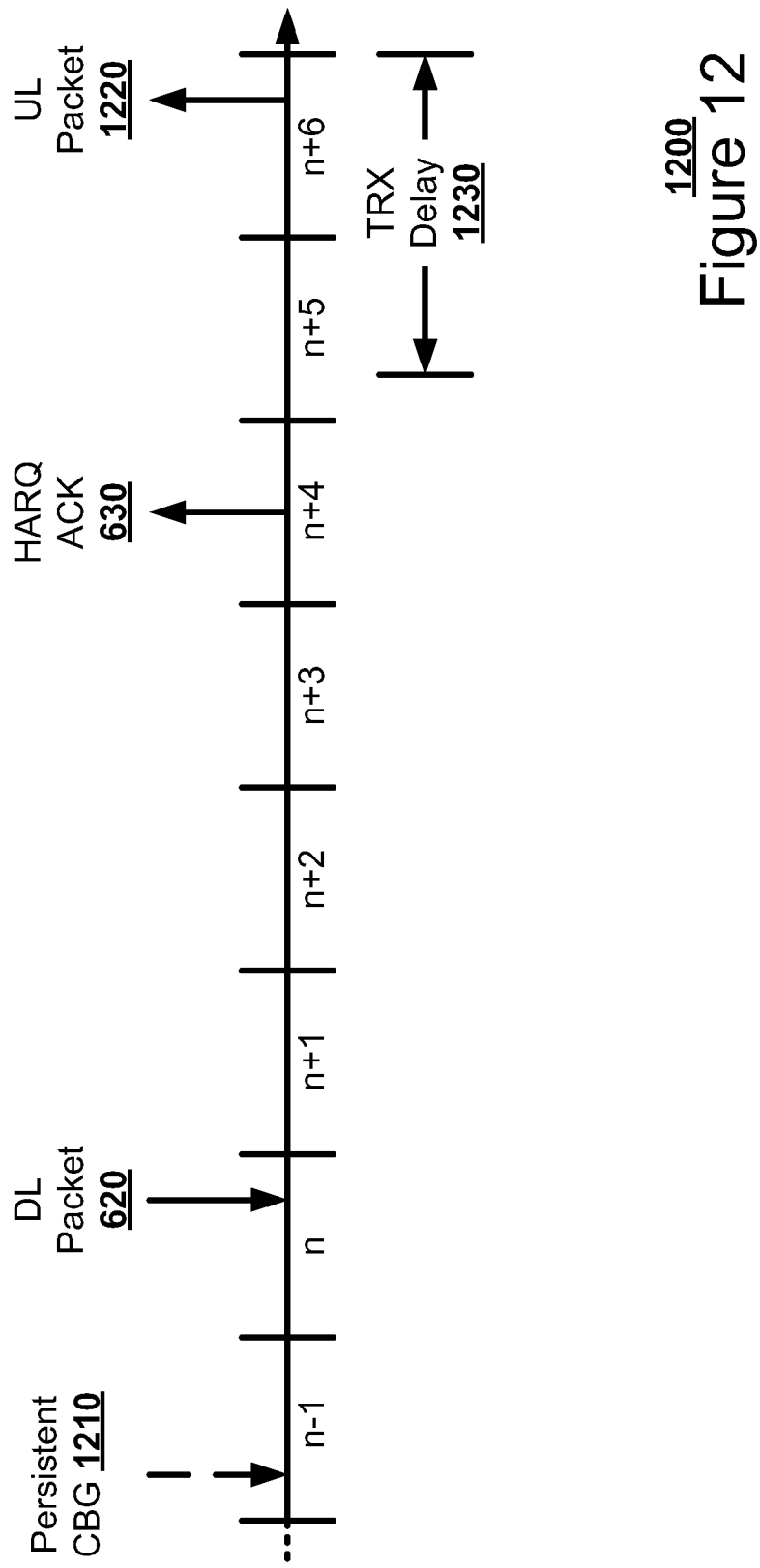
FIG. 12 illustrates, in a timing diagram, one embodiment of a sequence for sending a transmission on a contention based uplink channel using persistent stored grant data.

FIG. 12 illustrates, in a timing diagram, one embodiment of a sequence 1200 for sending a transmission on a contention based uplink channel using persistent stored grant data. The base station 108 may broadcast a persistent CBG allocation message 1210. The UE device 104 may receive a DL packet 620 in subframe n. The UE device 104 may respond by sending a HARQ ACK 630 to provide error checking for the channel.

The UE device 104 may store the CBG data 1020 from the persistent CBG allocation message 1210 at any point. Alternately, the reception of a downlink packet triggers storage of the persistent CBG data set. After the CBG data set 1020 has been stored and a UL packet 1220 becomes available from the first layer, the UE device 104 may configure the UL packet 1220 for transmission according to the CBG resources in the persistent CBG allocation message 1210. As the transceiver has an earlier start on storing the CBG data 1020, the TRX delay 1230 for the pre-stored CBG data 1020 may be substantially less than the standard TRX delay 650.

Figure 13:
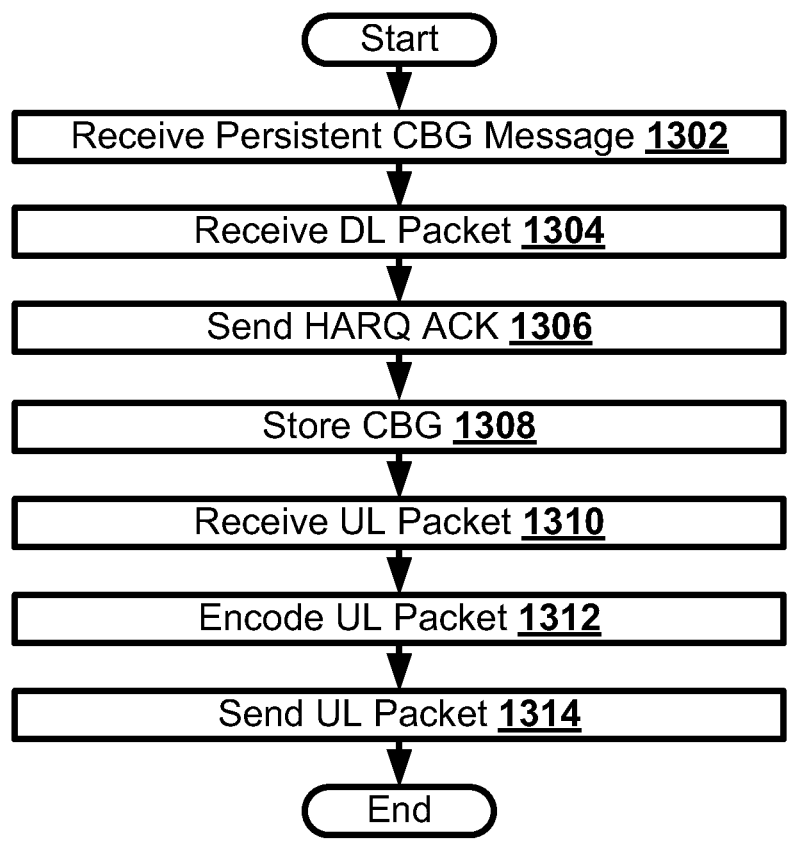
FIG. 13 illustrates, in a flowchart, one embodiment of a method for sending a transmission on a contention based uplink channel using persistent stored grant data.

FIG. 13 illustrates, in a flowchart, one embodiment of a method 1300 for sending a transmission on a contention based uplink channel using persistent stored grant data. The transceiver 302 may receive a persistent CBG allocation message 1210 from the base station 108 (Block 1302). The transceiver 302 of the UE device 104 may receive a DL packet 620 from a base station 108 (Block 1304). The transceiver 302 may respond by sending a HARQ ACK 630 to the base station 108 (Block 1306). The transceiver 302 may store the CBG allocation data 1020 in the configuration data storage 412 (Block 1308). The transceiver 302 may receive a UL packet 1220 for transmission from the UE device 104 (Block 1310). The controller 404 of the transceiver 302 may encode the UL packet 1220 for transmission based on the stored configuration data (Block 1312). The transmitting unit 406 of the transceiver 302 may send the UL packet 1220 to the base station 108 on the uplink channel determined by the stored configuration data (Block 1314).

A UE device 104 that spends much time in discontinuous reception mode (DRX) may miss a CBG allocation message if sent relatively infrequently. To prevent this, the base station 108 may send the CBG allocation message more frequently. A long term CBG allocation message may have a long term CBG data set to indicate availability of a set of resources for CBG allocations for a long period. A short term CBG allocation message may have a short term CBG data set to indicate availability of a different set of resources for CBG allocations for a short period. The short period may be any period of time as long as the short period is short in relation to the long period. The validity periods of the long term CBG allocations and the short term CBG allocations may overlap.

A UE device 104 that spends much time in DRX mode may rely on a long term CBG allocation and may forgo waiting for a short term CBG allocation message upon coming out of DRX. A UE device 104 that does not spend much time in DRX mode may use either the long term CBG allocation or the short term CBG allocation. A UE device 104 that is does not spend much time in DRX may be in a pervasive reception mode. The short term CBG allocation may allow the network to efficiently allocate uplink resources that become available dynamically.

Figure 14:
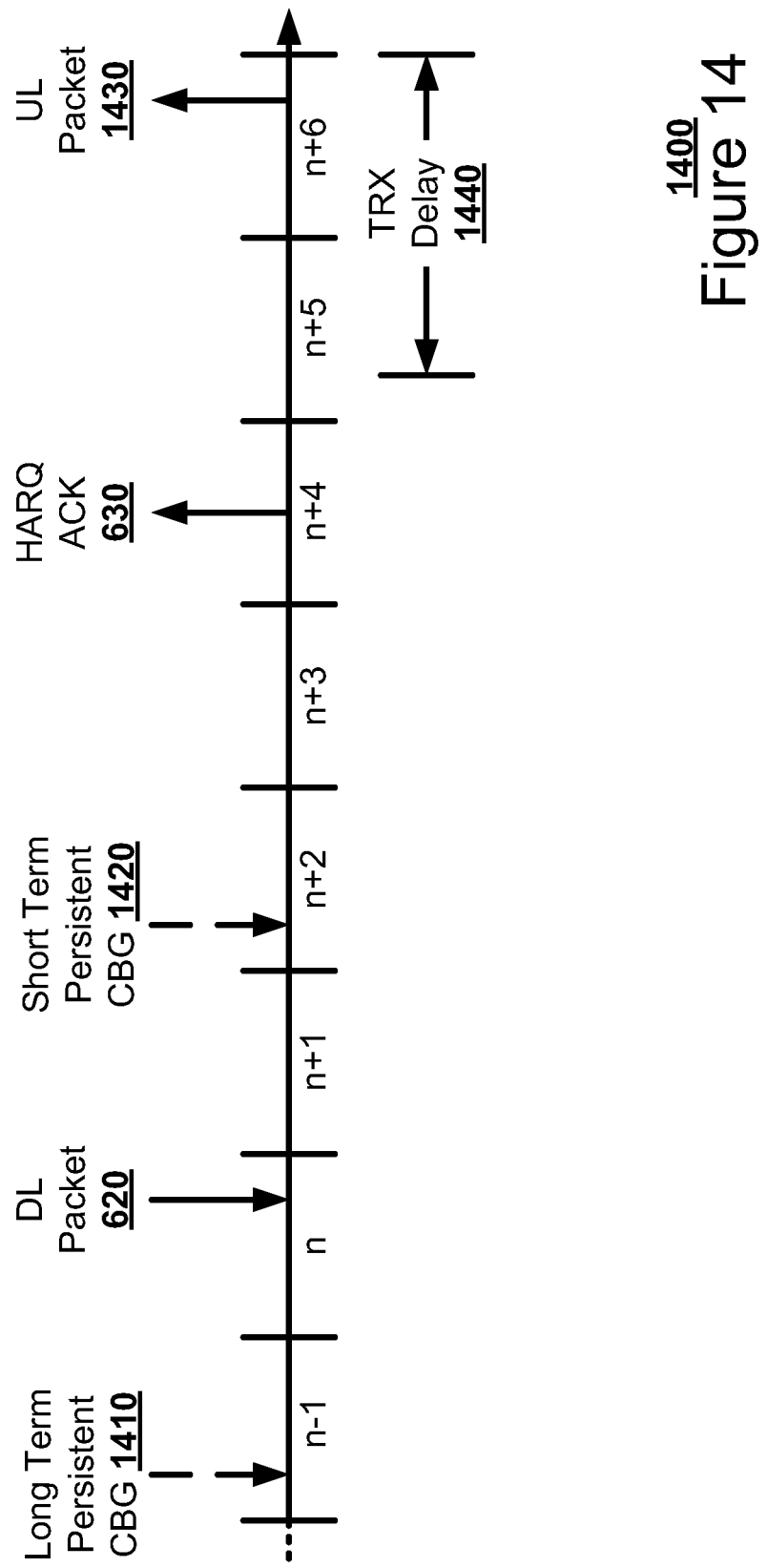
FIG. 14 illustrates, in a timing diagram, one embodiment of a sequence for sending a transmission on a contention based uplink channel using multiple sets of persistent stored grant data.

FIG. 14 illustrates, in a timing diagram, one embodiment of a sequence 1400 for sending a transmission on a contention based uplink channel using multiple sets of persistent stored grant data. The UE device 104 may receive a DL packet 620 in subframe n. The UE device 104 may respond by sending a HARQ ACK 630 to provide error checking for the channel.

The UE device 104 may receive a long term persistent CBG allocation message 1410 and a short term persistent CBG allocation message 1420. The UE device 104 may store the CBG data 1020 from either the long term persistent CBG allocation message 1410 or the short term persistent CBG allocation message 1420 at any point. Alternately, the reception of a DL packet 620 triggers storage of at least one of the long term CBG data set and the short term CBG data set. After the CBG data set 1020 has been stored and a UL packet 1430 becomes available from the first layer, the UE device 104 may configure the UL packet 1430 for transmission according to the CBG resources in either the long term persistent CBG allocation message 1420 or short term persistent CBG allocation message 1430, if available. As the transceiver has an earlier start on storing the CBG data 1020, the TRX delay 1440 for the pre-stored CBG data 1020 may be substantially less than the standard TRX delay 650.

Figure 15:
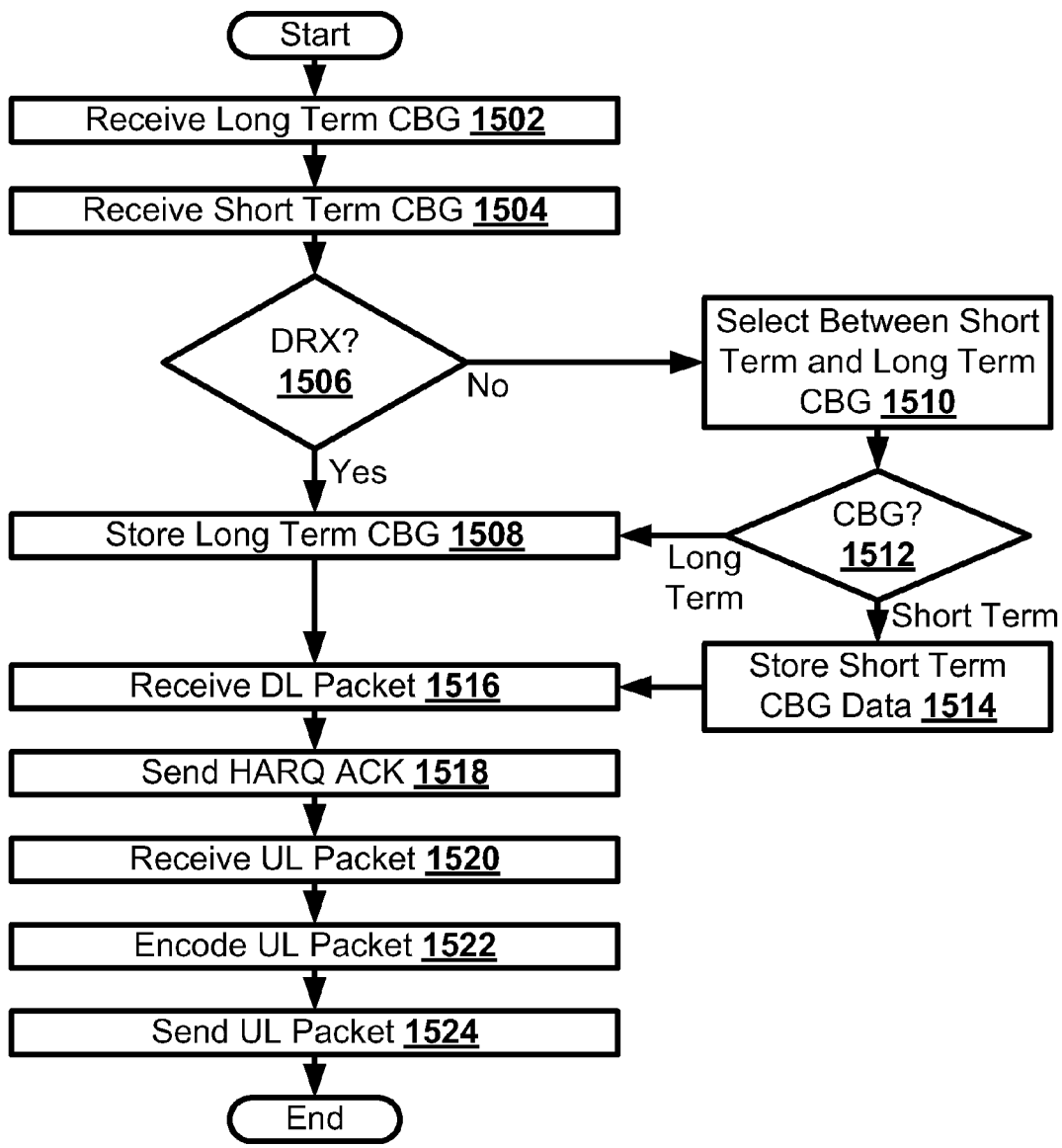
FIG. 15 illustrates, in a flowchart, one embodiment of a method for sending a transmission on a contention based uplink channel using multiple sets of persistent stored grant data.

FIG. 15 illustrates, in a flowchart, one embodiment of a method 1500 for sending a transmission on a contention based uplink channel using multiple sets of persistent stored grant data. The transceiver 302 may receive a long term persistent CBG allocation message 1410 from the base station 108 (Block 1502). The transceiver 302 may receive a short term persistent CBG allocation message 1420 from the base station 108 (Block 1504). If the UE device 104 is in a discontinuous reception mode (Block 1506), the transceiver 302 may store the long term CBG allocation data 1020 in the configuration data storage 412 (Block 1508). If the UE device 104 is in a pervasive reception mode (Block 1506), the controller 404 of the transceiver 302 may select between the short term CBG allocation and the long term CBG allocation (Block 1510). If the controller 404 selects the long term CBG allocation (Block 1512), the transceiver 302 may store the long term CBG allocation data 1020 in the configuration data storage 412 (Block 1508). If the controller 404 selects the short term CBG allocation (Block 1512), the transceiver 302 may store the short term CBG allocation data 1020 in the configuration data storage 412 (Block 1514).

The transceiver 302 of the UE device 104 may receive a DL packet 620 from a base station 108 (Block 1516). The transceiver 302 may respond by sending a HARQ ACK 630 to the base station 108 (Block 1518). The transceiver 302 may receive a UL packet for transmission from the UE device 104 (Block 1520). The controller 404 of the transceiver 302 may encode the UL packet 1430 for transmission based on the stored configuration data (Block 1522). The transmitting unit 406 of the transceiver 302 may send the UL packet 1430 to the base station 108 on the uplink channel determined by the stored configuration data (Block 1524).

In low to moderate loading conditions, the base station 108 may use the same set of resources for CBG allocations most of the time. However, occasional bursts of load may cause some or all of the set of resources to be unavailable for CBG allocations. A CBG allocation message may configure CBG allocation over a long period. However, the CBG allocation message may not actually activate the CBG allocations. The base station 108 may send an activation signal to activate or deactivate the configured CBG allocations. The activation signal may be a PDCCH indication. The activation signal may be sent in multiple subframes or at predefined times. The activation signal may activate or deactivate the CBG allocations in specific subframes. The activation signal may indicate the subframes in which the activation signal activates or deactivates the CBG allocations. The activation signal may enable the base station 108 to temporarily override the system configuration by activating or deactivating the CBG allocations for short periods.

A UE device 104 may first receive the CBG allocation message and store the CBG data set. When an uplink packet becomes available, the UE device 104 may check the second message to find the next occasion where a CBG resource is available and may transmit the uplink packet.

Figure 16:
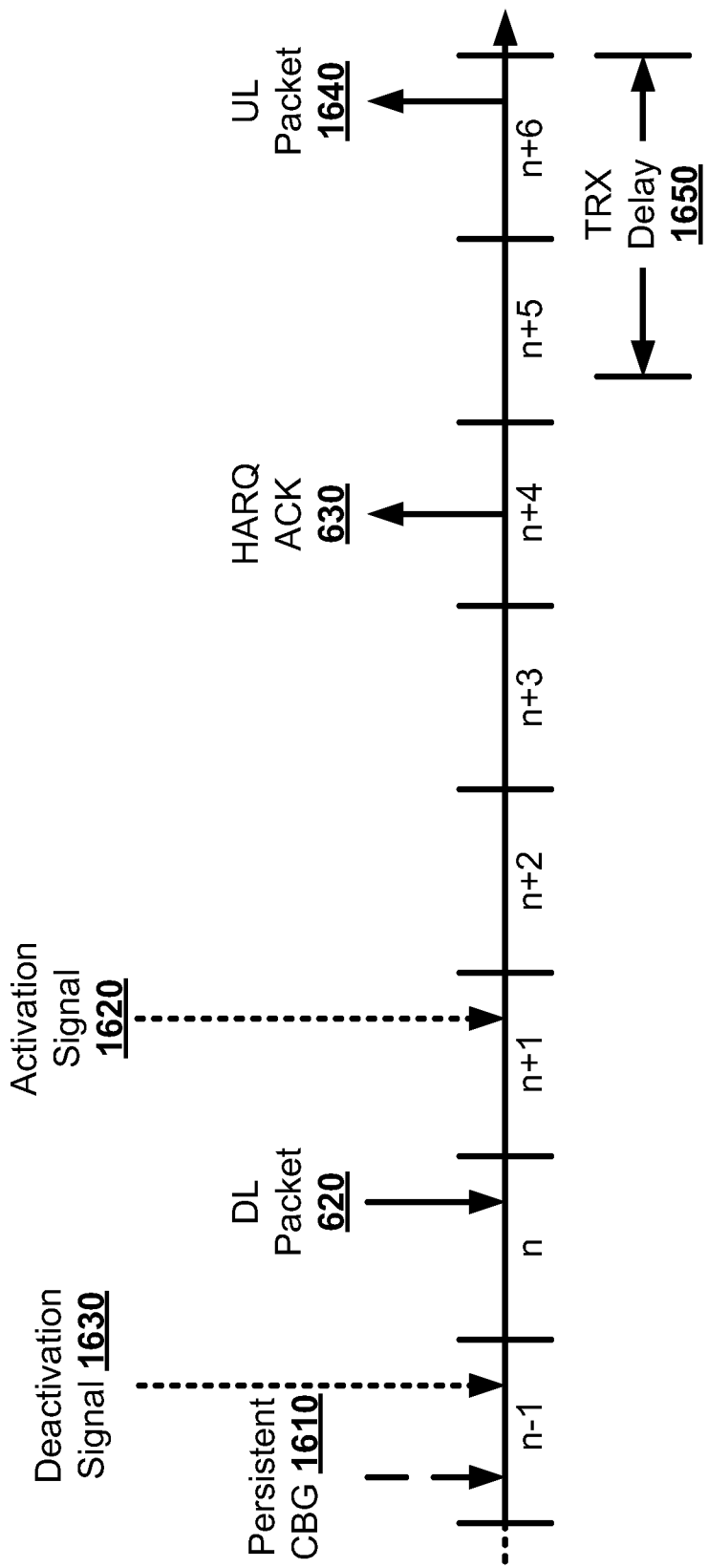
FIG. 16 illustrates, in a timing diagram, one embodiment of a sequence for sending a transmission on a contention based uplink channel using activated persistent stored grant data.

FIG. 16 illustrates, in a timing diagram, one embodiment of a sequence 1600 for sending a transmission on a contention based uplink channel using activated persistent stored grant data. The UE device 104 may receive a DL packet 620 in subframe n. The UE device 104 may respond by sending a HARQ ACK 630 to provide error checking for the channel.

The UE device 104 may receive a persistent CBG allocation message 1610. The UE device 104 may store the CBG data 1020 from the persistent CBG allocation message 1610 at any point. If the UE device 104 has received an activation signal 1620, the UE device 104 may use the CBG data 1020. If the UE device 104 has received a deactivation signal 1630, the UE device 104 may not use the CBG data set 1020. The deactivation signal may deactivate a persistent CBG allocation of the persistent CBG data set 1020. After the CBG data set 1020 has been stored and a UL packet 1640 becomes available from the physical layer, the UE device 104 may configure the UL packet 1640 for transmission according to the active CBG resources. As the transceiver has an earlier start on storing the CBG data set 1020, the TRX delay 1650 for the pre-stored CBG data set 1020 may be substantially less than the standard TRX delay 650.

Figure 17:
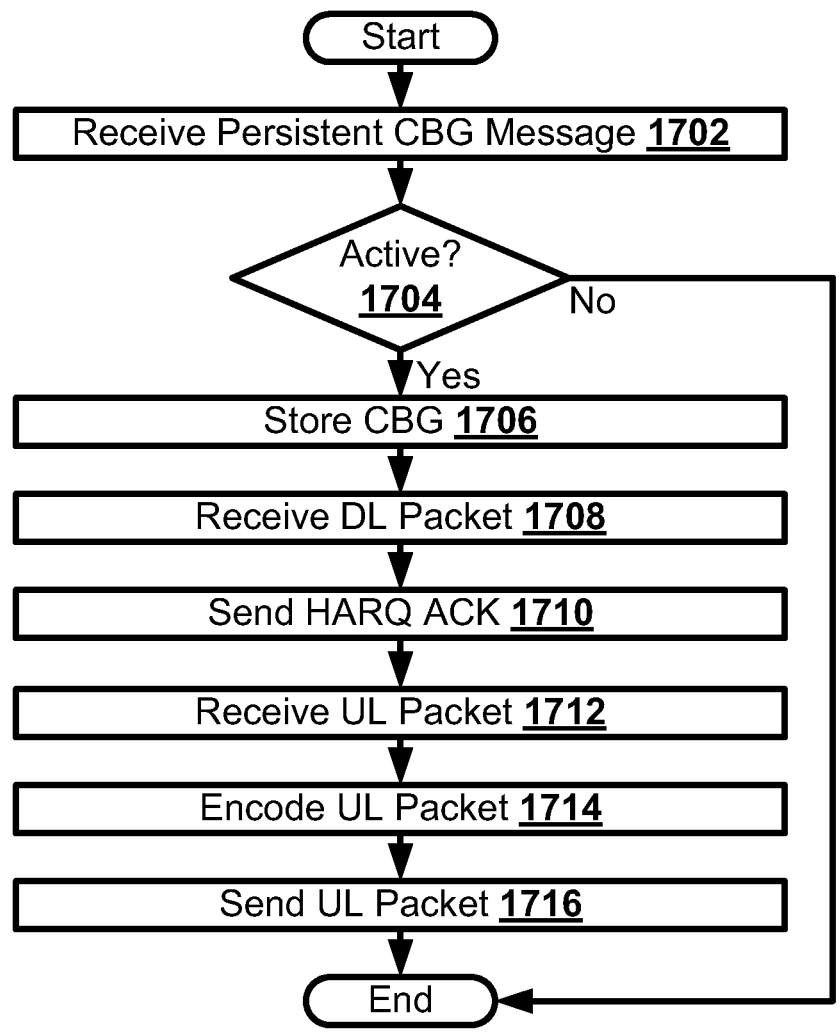
FIG. 17 illustrates, in a flowchart, one embodiment of a method for sending a transmission on a contention based uplink channel using activated persistent stored grant data.

FIG. 17 illustrates, in a flowchart, one embodiment of a method 1700 for sending a transmission on a contention based uplink channel using activated persistent stored grant data. The transceiver 302 may receive a persistent CBG allocation message 1210 from the base station 108 (Block 1702). If the CBG data is active (Block 1704), the transceiver 302 may store the CBG allocation data set 1020 in the configuration data storage 412 (Block 1706). The transceiver 302 of the UE device 104 may receive a DL packet 620 from a base station 108 (Block 1708). The transceiver 302 may respond by sending a HARQ ACK 630 to the base station 108 (Block 1710). The transceiver 302 may receive a UL packet 1220 for transmission from the UE device 104 (Block 1712). The controller 404 of the transceiver 302 may encode the UL packet 1220 for transmission based on the stored configuration data (Block 1714). The transmitting unit 406 of the transceiver 302 may send the UL packet 1220 to the base station 108 on the uplink channel determined by the stored configuration data (Block 1716).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for supporting a contention based uplink channel for a user communication device, comprising:
   receiving a packet from a base station;
   determining whether a data transmission buffer is empty upon receiving the packet, wherein the data transmission buffer holds data that has not been previously transmitted by the device;
   receiving contention based grant data after receiving the packet, wherein the contention based grant data includes a long term contention based grant data set received from a long term persistent contention based grant allocation message and a short term contention based grant data set received from a short term persistent contention based grant allocation message;
   storing the contention based grant data if the data transmission buffer is empty and if no dedicated uplink resource is available; and
   sending an uplink packet based on the short term contention based grant data set if the short term contention based grant is valid at an earlier time than the long term contention based grant data and based on the long term contention based grant data set if the short term contention based grant is not valid at an earlier time than the long term contention based grant data.

2. The method of claim 1, wherein receiving contention based grant data comprises receiving the contention based grant data in a contention based grant allocation message sent as a physical data control channel transmission addressed to a contention based radio network temporary identifier.

3. The method of claim 1, wherein receiving contention based grant data comprises receiving the contention based grant data in a persistent contention based grant allocation message.

4. The method of claim 3, wherein the persistent contention based grant allocation message is received in at least one of a system information message, a medium access control element, and a grant allocation message.

5. The method of claim 3, further comprising:
   receiving a deactivation signal that deactivates a persistent content based grant allocation.

6. The method of claim 3, further comprising:
   receiving an activation signal that activates a persistent content based grant allocation.

7. The method of claim 1, further comprising:
   storing contention based grant data from the long term persistent contention based grant allocation message if the user communication device is in a discontinuous reception mode.

8. The method of claim 1, further comprising:
   storing contention based grant data from at least one of the long term persistent contention based grant allocation message and the short term persistent contention based grant allocation message if the user communication device is in a pervasive reception mode.

9. The method according to claim 1, wherein the data transmission buffer holds only data that has not been previously transmitted by the device.

10. A user communication device for supporting a contention based uplink channel with a base station, comprising:

a controller configured to determine whether a non-contention based grant is available for a transmission;

a configuration data storage that stores a long term contention based grant data set received from a long term persistent contention based grant allocation message and a short term contention based grant data set received from a short term persistent contention based grant allocation message, if no non-contention based grants are available; and a transceiver that sends an uplink packet based on the short term contention based grant data set if the short term contention based grant is valid at an earlier time than the long term contention based grant data and based on the long term contention based grant data set if the short term contention based grant is not valid at an earlier time than the long term contention based grant data.

11. The user communication device of claim 10, wherein reception of a downlink packet triggers storage of at least one of the long term contention based grant data set and the short term contention based grant data set.

12. The user communication device of claim 10, wherein the transceiver uses the long term contention based grant data set if the user communication device is in a discontinuous reception mode.

13. The user communication device of claim 10, wherein the transceiver uses the short term contention based grant data set if the user communication device is in a pervasive reception mode.

14. The user communication device of claim 10, wherein the transceiver receives a deactivation signal that deactivates a persistent content based grant allocation.

15. The user communication device of claim 10, wherein the transceiver receives an activation signal that activates a persistent content based grant allocation.

16. A mobile system that supports a contention based uplink channel with a base station, comprising:

a configuration data storage that stores a persistent contention based grant data set if no dedicated uplink resource is available, where the persistent contention based grant data set is received in a persistent contention based grant allocation message and activated by an activation signal, where the persistent contention based grant data set indicates a sequence of resources, each resource in the sequence available to a plurality of users, the contention based grant data set further including a long term contention based grant data set received from a long term persistent contention based grant allocation message and a short term contention based grant data set received from a short term persistent contention based grant allocation message; and a transceiver that sends an uplink packet based on the short term contention based grant data set if the short term contention based grant is valid at an earlier time than the long term contention based grant data and based on the long term contention based grant data set if the short term contention based grant is not valid at an earlier time than the long term contention based grant data if uplink resources not subject to contention are unavailable, wherein reception of a downlink packet triggers storage of the persistent contention based grant data set.

17. The mobile system of claim 16, wherein the transceiver receives a deactivation signal that deactivates a persistent content based grant allocation of the persistent content based grant data set.

18. A method for supporting a contention based uplink channel for a user communication device, comprising:

receiving a contention based grant at the user communication device from the base station, wherein the contention based grant includes a long term contention based grant data set received from a long term persistent contention based grant allocation message and a short term contention based grant data set received from a short term persistent contention based grant allocation message;

receiving a transmission control protocol packet at the user communication device from a base station;

storing the contention based grant upon receiving the transmission control protocol packet and prior to acknowledgement of the transmission control protocol packet becoming available, if the device does not have data to transmit and if no dedicated uplink resource is available;

sending an acknowledgement of the transmission control protocol packet to the base station based on the contention based grant data; and sending an uplink packet based on the short term contention based grant data set if the short term contention based grant is valid at an earlier time than the long term contention based grant data and based on the long term contention based grant data set if the short term contention based grant is not valid at an earlier time than the long term contention based grant data.

19. The method according to claim 18, further comprising configuring the uplink packet for transmission according to contention based data grant resources determined from the contention based data grant.

20. The method according to claim 19, further comprising transmitting the uplink packet after sending the acknowledgement of the transmission control protocol packet.

21. The method according to claim 18, wherein receiving the contention based data grant comprises receiving the contention based data grant after receiving the transmission control protocol packet.

* * * * *